United States Patent

[11] 3,627,625

| [72] | Inventor | Kenneth Barry Jarrett<br>Hitchin, England |
|---|---|---|
| [21] | Appl. No. | 41,713 |
| [22] | Filed | May 27, 1970 |
| [45] | Patented | Dec. 14, 1971 |
| [73] | Assignee | Imperial Chemical Industries Limited<br>London, England |
| [32] | Priority | June 17, 1966 |
| [33] | | Great Britain |
| [31] | | 27,082/66 |
| | | Continuation of application Ser. No.<br>641,473, May 26, 1967, now abandoned.<br>This application May 27, 1970, Ser. No.<br>41,713 |

[54] BIAXIALLY ORIENTED SHEET
6 Claims, No Drawings

[52] U.S. Cl................................................... 161/165,
161/168, 161/231, 161/402, 161/411, 260/40 R,
264/210, 264/289

[51] Int. Cl....................................................... B29d 7/24,
B32b 27/36

[50] Field of Search............................................ 161/165,
231, 168, 402, 411; 264/210, 289; 260/40, 40 P

[56] References Cited

UNITED STATES PATENTS

| 3,201,506 | 8/1965 | Bills............................ | 264/289 |
| 3,407,112 | 10/1968 | Karickhoff et al............ | 161/165 |
| 3,366,597 | 1/1968 | Fort............................. | 260/40 P |
| 3,177,277 | 4/1965 | Adams et al.................. | 264/210 |
| 3,400,041 | 9/1968 | Rasmussen................... | 161/402 X |
| 3,419,460 | 12/1968 | Ure.............................. | 161/402 X |
| 3,434,916 | 3/1969 | Braunish et al............... | 161/231 |

OTHER REFERENCES

Modern Plastics Encyclopedia, 1966, Vol. 43, No. 1A, Sept. 1965, McGraw Hill, p. 545

*Primary Examiner*—Harold Ansher
*Assistant Examiner*—George W. Moxon, II
*Attorney*—Cushman, Darby & Cushman

ABSTRACT: Uniformly biaxially oriented sheet of polyethylene terephthalate containing from 1 percent to 15 percent by weight of a finely divided inert filler and of a finely divided inert filler and of a thickness of from 0.014 to 0.035 inch. The sheet is prepared by extruding an amorphous polyethylene terephthalate sheet containing from 1 percent to 15 percent of a finely divided inert filler and then drawing it at a temperature of from 80° to 130°C. in the machine direction and in the transverse direction, the draw ratio in either direction being sufficiently great to allow uniform drawing of the sheet but less than 3.25. The filler has a particle size of 0.1 microns to 5.0 microns and may be, for example, titanium dioxide.

BIAXIALLY ORIENTED SHEET

This application is a continuation of U.S. application Ser. No. 641,473, filed May 26, 1967, entitled BIAXIALLY ORIENTED SHEET, which application is now abandoned.

This invention relates to biaxially oriented sheet. In particular it relates to biaxially oriented polyethylene terephthalate sheet.

In the process for the production of biaxially oriented polyethylene terephthalate film, the amorphous film is extruded and then quenched, e.g. on a cold roller, to a temperature below its glass to rubber transition point in order to prevent any crystallization of the extruded melt. Because of heat transfer limitations, amorphous film thicker than about 0.150 inch cannot readily be produced. Since the draw ratios required to produce uniformly oriented film from unfilled amorphous film are at least 3.25 in both the machine and transverse directions, this limitation of the thickness of the amorphous film means that uniformly oriented film thicker than about 0.014 inch cannot be produced on a commercial scale.

It is an object of this invention to overcome the above difficulty.

Accordingly we provide a uniformly biaxially oriented sheet of polyethylene terephthalate containing from 1 percent to 15 percent of a finely divided inert filler and of a thickness of from 0.014 to 0.035 inch.

We also provide a process for the production of sheet according to our invention which comprises extruding an amorphous polyethylene terephthalate sheet containing from 1 percent to 15 percent of a finely divided inert filler and then drawing it at a temperature of from 80°0 to 130° C. in the machine direction and in the transverse direction, the draw ratio in either direction being sufficiently great to allow uniform drawing of the sheet but less than 3.25.

The actual value of the draw ratio which may be used in order to produce a uniformly drawn sheet depends on the amount of the finely divided inert filler contained in the film, the more filler being present the lower the draw ratio which is possible. For example, a film containing 1 percent or filler may not be drawn uniformly at a draw ratio lower than 2.6, whereas a film containing 5 percent of filler may be drawn at a draw ratio as low as 2.2.

Film containing more than 15 percent of filler can not easily be processed in an extruder.

The particle sizes of the fillers which may be used in producing sheets according to our invention are preferably from 0.1 microns to 5 microns. For some applications in which the sheet is subjected to violent stress during shaping it is important also that the distribution of the particles sizes should be over a narrow range. Examples of suitable fillers include silica (including diatomaceous silica), silicates and alumino silicates (e.g., clay and china clay), titanium dioxide, abrasives such as powdered glass or carborundum and decorative materials, e.g. talc, ground mica or ground mother-of-pearl.

We prefer in order to get the optimum dispersion of the filler in the sheets to add the filler during the production of the polymer or its precursors. For example, it can be easily dispersed in the ethylene glycol before adding that substance to the dimethyl terephthalate to carry out the ester interchanging step prior to polymerization.

The amorphous polyethylene terephthalate sheet may be obtained by immediately quenching it as it emerges from the extruder to below its rubber to glass transition point and this may conveniently be done by passing it round a chilled rotating drum. In order successfully to produce the thick sheets to which this invention relates it is necessary to ensure that the heat transfer between the extruded sheet and the cooling drum is very good. We therefore prefer that the sheet should be pinned to the drum, e.g. by a blast of chilled air or by means of an electrostatic charge deposited on the upper surface of the sheet from an electrostatic charging wire held near to the upper surface of the sheet, the drum being maintained at a considerably lower tension than the electrostatic charging wire preferably by earthing the drum.

The sheets may be drawn by means of the methods which are well known in the art of producing oriented polyethylene terephthalate sheet. They may be drawn first in the machine direction, that is in the direction of extrusion and then in transverse direction or they may be drawn in the transverse direction first. In the case of the machine direction, drawing may conveniently be carried out between "slow" and "fast" rollers, a heating element, e.g. an infrared heater being placed between the two sets of rollers. Alternatively, machine direction drawing may be carried out over a series of heated, closely spaced rollers all of which or only some of which, e.g. the first and last, may be driven. Drawing of the sheet in the transverse direction may conveniently be carried out on a stenter frame which is enclosed in a hot-air oven so that the drawing temperature can be maintained.

An alternative method to the above sequential methods of biaxial drawing is to carry out the drawing simultaneously in both machine and transverse directions and a number of pieces of equipment have been proposed for doing this, e.g. a stenter in which transverse drawing by divergence of the stenter rails is accompanied by machine direction drawing due to increasing longitudinal separation between the stenter clips as they pass through the apparatus. We prefer that the oriented sheets according to our invention should be heat-set, that is maintained at a temperature of from 150° to 230°C, preferably 180° to 230°C., while being restrained from shrinking. We find that our sheets have a shrinkage when held at 200°C. for 1 minute of not greater than 3 percent.

The sheets according to our invention may be modified in many of the ways well known for polyethylene terephthalate film, e.g. they may be coated by means of melt coating, solution coating or dispersion coating with a thermoplastic material to make them heat-sealable. Examples of such coatings include polyethylene, ethylene/vinyl acetate copolymers, polyvinyl acetate, hydrolyzed polyvinyl acetate, vinyl chloride/vinyl acetate copolymers, butadiene/methyl methacrylate copolymers and butadiene/methyl methacrylate/styrene copolymers. The heat sealed coatings may also be such that they, in addition confer on to the sheet impermeability to water vapor and other gases. Examples of such coatings are those of copolymers with vinylidene chloride with one or more of acrylonitrile, itaconic acid, vinyl chloride or acrylic acid. They may also be laminated to other materials such as paper, wood, metal sheets and foils.

The sheets of our invention are suitable for many applications because they have a high-surface finish which is obtained without use of any expensive laminating techniques and, because of the low-draw ratio used in their production, they can be further formed into shaped articles. Thus the sheets of our invention may be used in the construction of facing panels, e.g. for household appliances or in the construction of buildings and vehicles especially when lightness of weight is desired, e.g. in aircraft. They provide a thermoplastic sheet of hitherto unknown dimensional stability for use in these applications with consequent increased ease in assembly.

The sheets may be further formed into shaped articles, e.g. by vacuum forming at the temperature commonly used in vacuum forming or they may be formed at room temperature by mechanical punching or pressing machines such as are used for the production of press-formed articles from sheet metal. Metal components may also be integrally joined to our films by means of such press-forming, e.g. metal hinges could be thus flush fitted for the production, e.g. of book covers. Because of the dimensional stability of the heat-set films they are particularly useful in the production of such components by vacuum forming or by cold pressing which are to be exposed to elevated temperatures during their use, e.g. for the production of shaped articles to be used under the bonnet of a motor car or for reflectors in lighting fittings and in low-power radiant heaters.

Examples of other uses for the sheets according to our invention include slot liners and slot closures for electric motors; stiffeners for textile garments, e.g. collar stiffeners;

strapping tapes; rulers and protractors; gaskets; bursting discs; diaphragms and conveyor belting.

EXAMPLE 1

A sheet of polyethylene terephthalate 0.102 inch thick and containing 1.8 percent of titanium dioxide having an average particle size of 0.2 microns and 90 percent of the particles being within the range 0.15 to 0.3 microns was extruded and quenched on a chilled, earthed, drum to which it was pinned by means of an electrostatic pinning wire. The sheet was first drawn in the machine direction at a temperature of 85°C. and then in the transverse direction at a temperature of 85°C, the draw ratio in each case being 2.6. It was then heat-set by being maintained at a temperature of 210°C. in an extension of the stenter used for the transverse drawing and in which it was restrained from any relaxation.

The resulting sheet was 0.015 inch in thickness and had an excellent glossy surface. When held at 200°C. for 1 minute it had a shrinkage of 2 percent.

A number of hemispherical cups were pressed from circular blanks cut from the sheet in a press-forming machine at room temperature. A die of 0.5 inch in diameter was used and cups of excellent shape which exhibited no cracking, crazing or splitting were produced from blanks of up to 1.2 inch in diameter.

EXAMPLE 2

An undrawn sheet of polyethylene terephthalate 0.102 inch thick and containing 10 percent of the titanium dioxide filler used in example 1 was drawn first in the machine direction and then in the transverse direction at a temperature of from 80° to 85°C., the draw ratio in each direction being 2.4, and then heat set at constant area at a temperature of 210°C.

The resultant sheet was 0.018 inch thick and had a shrinkage of about 2 percent when measured by maintaining the sheet at 200°C. for 1 minute.

I claim:

1. In a uniformly biaxially oriented sheet of polyethylene terephthalate film which has been uniformly oriented in both the machine and transverse directions and which has a thickness, prior to orientation, of no greater than 0.150 inch the improvement comprising the uniformly biaxially oriented sheet containing 1 to 15 percent by weight of a filler having a particle size of from 0.1 to 5 microns and being oriented from 2.2 times to 3.25 times in both directions and the final thickness of the sheet after orientation being from 0.015 inch and up to 0.035 inch.

2. A sheet according to claim 1 in which the distribution of the particle sizes of said filler is from 0.1 to 5 microns.

3. A sheet according to claim 1 having a shrinkage when held at 200°C. for 1 minute of not greater than 3 percent.

4. A sheet according to claim 1, wherein the said filler is titanium dioxide.

5. Uniformly biaxially oriented sheet of polyethylene terephthalate containing from 1 percent to 15 percent of a finely divided inert filler and of a thickness of from 0.15 to 0.035 inch.

6. A sheet according to claim 5 wherein the said filler is titanium dioxide.

* * * * *